US008743384B2

(12) United States Patent
Ishii et al.

(10) Patent No.: US 8,743,384 B2
(45) Date of Patent: Jun. 3, 2014

(54) IMAGE FORMING APPARATUS AND COMMUNICATION CONTROL PROGRAM PRODUCT

(75) Inventors: Tatsuya Ishii, Kanagawa (JP); Yoshihisa Ashikawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 308 days.

(21) Appl. No.: 13/232,246

(22) Filed: Sep. 14, 2011

(65) Prior Publication Data

US 2012/0062929 A1 Mar. 15, 2012

(30) Foreign Application Priority Data

Sep. 15, 2010 (JP) ................................. 2010-207321
Aug. 17, 2011 (JP) ................................. 2011-178434

(51) Int. Cl.
*G06K 15/02* (2006.01)

(52) U.S. Cl.
USPC ......... 358/1.14; 358/1.13; 358/1.12; 358/1.9; 399/12; 399/88; 370/318; 370/328

(58) Field of Classification Search
None
See application file for complete search history.

(56) References Cited

U.S. PATENT DOCUMENTS

| | | | | |
|---|---|---|---|---|
| 6,073,610 | A * | 6/2000 | Matsumoto et al. | 123/396 |
| 6,643,527 | B2 * | 11/2003 | Satoh et al. | 455/574 |
| 6,775,018 | B1 * | 8/2004 | Taniguchi | 358/1.14 |
| 7,369,783 | B2 * | 5/2008 | Kikuchi | 399/12 |
| 7,590,082 | B2 * | 9/2009 | Ogawa | 370/318 |
| 7,853,164 | B2 | 12/2010 | Sanada et al. | |
| 2006/0140145 | A1 * | 6/2006 | Ogawa | 370/328 |

FOREIGN PATENT DOCUMENTS

| | | |
|---|---|---|
| JP | 4-213271 | 8/1992 |
| JP | 2009-214436 | 9/2009 |

* cited by examiner

*Primary Examiner* — Ashish K Thomas

(74) *Attorney, Agent, or Firm* — Oblon, Spivak, McClelland, Maier & Neustadt, L.L.P.

(57) ABSTRACT

An image forming apparatus is provided with a processing unit that performs a predetermined process, a power-supply shutting unit that shuts off power supply to the processing unit when a predetermined door is opened, a voltage detecting unit that detects a decrease in voltage at a point located posterior to the power-supply shutting unit, and a communication control unit that does not initiate communication with the processing unit if the decrease in voltage is detected by the voltage detecting unit before a start of the communication with the processing unit, and judges the just-ended communication as abnormal if the decrease in voltage is detected by the voltage detecting unit after the end of the communication with the processing unit.

8 Claims, 7 Drawing Sheets

| STATE | JUDGMENT OF DC 11 | JUDGMENT OF DC 30 | INITIATE OF COMMUNICATION |
|---|---|---|---|
| (1) | HIGH | HIGH | POSSIBLE |
| (2) | LOW | HIGH | NOT POSSIBLE |
| (3) | LOW | LOW | NOT POSSIBLE |
| (4) | HIGH | LOW | NOT POSSIBLE |
| (5) | HIGH | HIGH | POSSIBLE |

IMAGE FORMING APPARATUS AND COMMUNICATION CONTROL PROGRAM PRODUCT

CROSS-REFERENCE TO RELATED APPLICATIONS

The present application claims priority to and incorporates by reference the entire contents of Japanese Patent Application No. 2010-207321 filed in Japan on Sep. 15, 2010 and Japanese Patent Application No. 2011-178434 filed in Japan on Aug. 17, 2011.

BACKGROUND OF THE INVENTION

1. Field of the Invention

The present invention relates to an image forming apparatus capable of detecting a communication error and a communication control program product.

2. Description of the Related Art

Image processing of an image forming apparatus is controlled by communication among a plurality of units for performing various controls in the image forming apparatus. In some units, the power may be turned off when the predetermined door provided for the image forming apparatus is opened (hereinafter this trigger may be referred to as "door opening"). In the image forming apparatus provided with such a kind of unit, the normal communication is not initiated between the apparatus and the unit if the door opening occurs.

In order to overcome this inconvenience, there is a known method of detecting the communication error by the parity check, and checking the opening/closing status of the door after the communication error is detected, in order to determine whether the communication error is caused by the door opening or by a trouble of the communication means or lines.

For example, Japanese Patent Application Laid-open No. H04-213271 discloses a configuration provided with a door opening/closing detecting unit for detecting the opening/closing status of the door in order to determine the communication error is caused by the door opening or by the trouble of the communication means or lines (the true communication error), a communication status detecting unit such as parity check for detecting that the communication is normally initiated, a communication monitoring unit for storing the detection result, and a self diagnosing unit for diagnosing the status of the apparatus on the basis of the detecting result of the door opening/closing detecting unit and the content stored in the communication monitoring unit.

However, the disclosed method has a problem as follows. In a case that the door opening occurs in the middle of communication, the parity check may fail in detecting the communication error at some timing between the data transfer and the door opening detection. Therefore, there is a risk that a wrong data is retrieved.

SUMMARY OF THE INVENTION

It is an object of the present invention to at least partially solve the problems in the conventional technology.

According to an aspect of the present invention, there is provided an image forming apparatus including a processing unit that performs a predetermined process, a power-supply shutting unit that shuts off power supply to the processing unit when a predetermined door is opened, a voltage detecting unit that detects a decrease in voltage at a point located posterior to the power-supply shutting unit, and a communication control unit that does not initiate communication with the processing unit if the decrease in voltage is detected by the voltage detecting unit before a start of the communication with the processing unit, and judges the just-ended communication as abnormal if the decrease in voltage is detected by the voltage detecting unit after the end of the communication with the processing unit.

According to an aspect of the present invention, there is provided a computer program product comprising a non-transitory computer-readable medium having computer-readable program codes embodied in the medium for controlling a communication, the program codes when executed causing a computer to execute, the computer including a processing unit that performs a predetermined process, and a power-supply shutting unit that shuts off power supply to the processing unit when a predetermined door is opened, detecting a decrease in voltage of a point located posterior to the power-supply shutting unit, and not initiating communication with the processing unit if the decrease in voltage is detected before a start of the communication with the processing unit and judging the just-ended communication as abnormal if the decrease in voltage is detected after an end of the communication with the processing unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of an image forming apparatus and a communication control program according to the present invention is explained in detail below with reference to the accompanying drawings.

Figure 1:
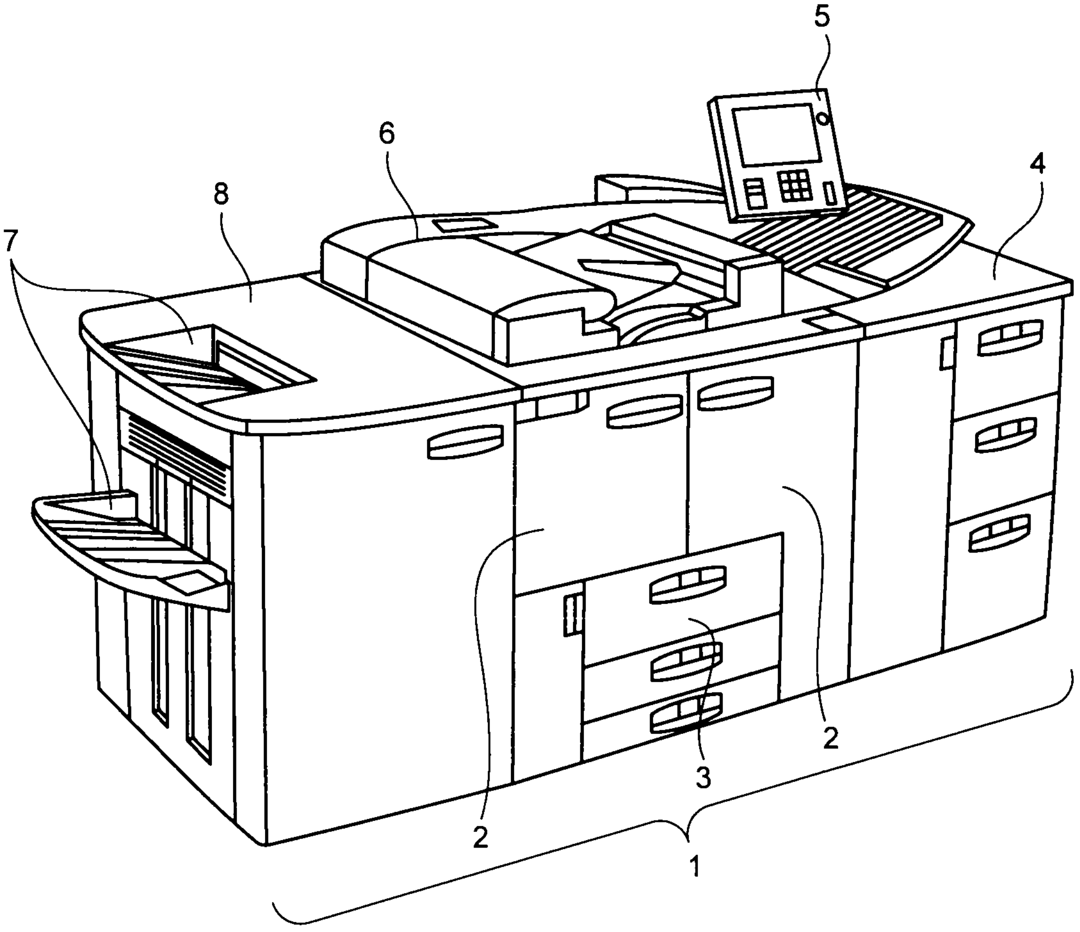
FIG. 1 is an overall view showing the appearance of an image forming apparatus according to an embodiment of the present invention.

FIG. 1 is an overall view showing the appearance of an image forming apparatus 100 according to the present embodiment. As shown in FIG. 1, the image forming apparatus 100 mainly includes a main body unit 1 that controls the image forming operation; a large-capacity sheet feed unit 4 that contains a large stack of sheets or the like in the main body unit 1; a finisher 8 that performs sorting, punching, binding, etc. on printed sheets; and a copy receiving unit 7 onto which sheets subjected to printing, sorting, etc. are discharged.

The main body unit 1 has an automatic document feeder 6 on top thereof, and an original set in the automatic document feeder 6 is scanned by a scanner unit (not shown). Furthermore, on top of the main body unit 1, an operation unit 5 on which an interface to allow a user to input various instructions is placed is mounted. To the center of a front surface of the main body unit 1, a door 2 for covering toner and the like contained in the main body unit 1 is attached. Incidentally, when the door 2 is opened, a drive system is shut down for the safety in the operation made by a user.

Moreover, in the lower part of the main body unit 1, a sheet feed unit 3 is provided; sheets, such as paper or OHP sheets, on which an image is to be formed, are contained in the sheet feed unit 3, and an image is formed on a sheet fed from the sheet feed unit 3.

Figure 2:
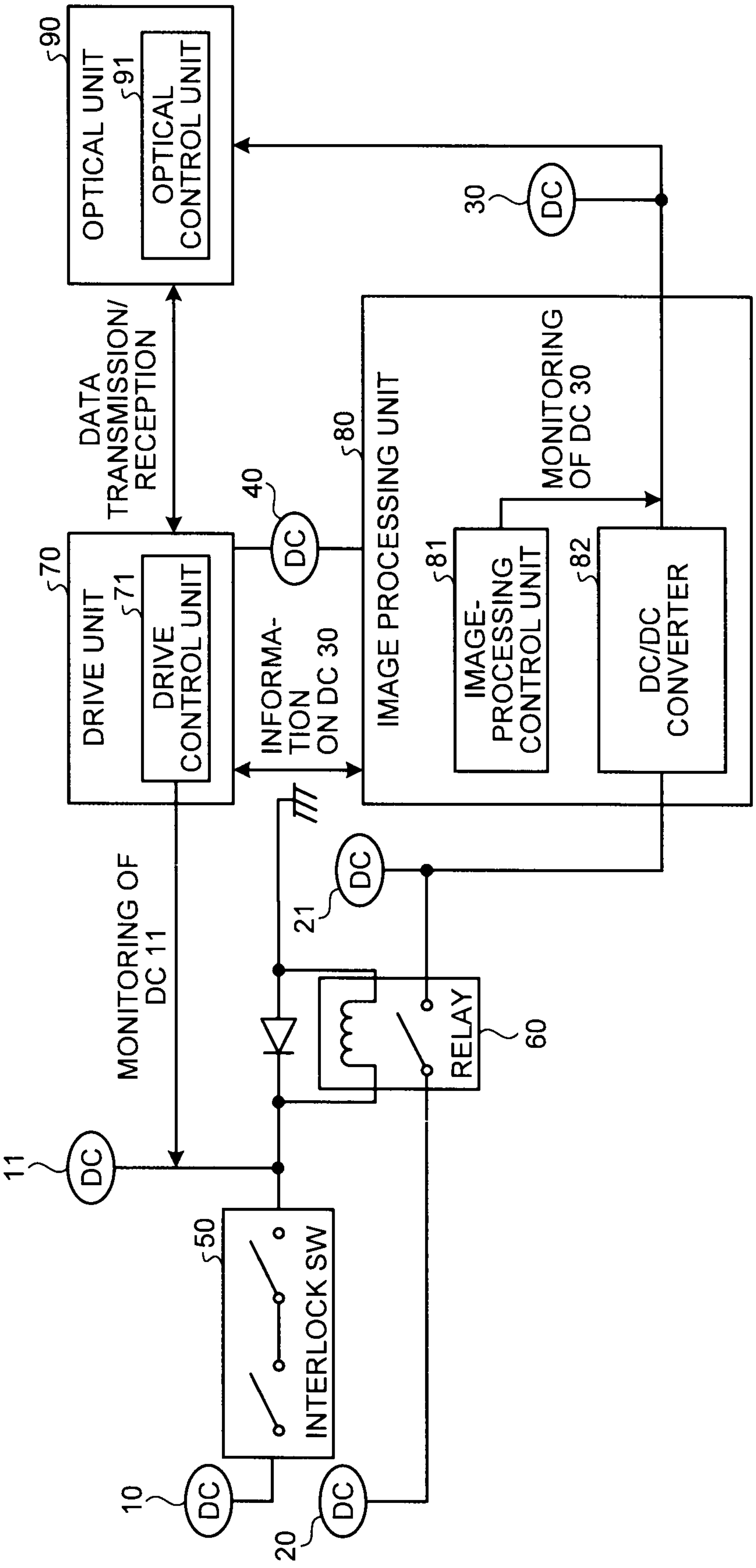
FIG. 2 is a block diagram showing a configuration of a power-supply circuit for supplying power to units included in the image forming apparatus.

Subsequently, a configuration and operation of a power-supply circuit of the image forming apparatus 100 are explained. FIG. 2 is a block diagram showing the configuration of the power-supply circuit for supplying power to the units included in the image forming apparatus 100. As shown in FIG. 2, a power supply unit of the image forming apparatus 100 mainly includes an interlock SW (switch) 50 to which electric power supplied from a DC power supply 10 is input, a relay 60 connected to the interlock SW 50, a drive unit 70 to which electric power supplied from a DC power supply 40 is input, an image processing unit 80 to which electric power supplied from a DC power supply 21 is input, and an optical unit 90 to which electric power supplied from a DC power supply 30 is input.

The interlock SW 50 is a switch which is turned off in a mechanically interlocked manner with the door opening (the opening of the door 2) so that voltage supplied from the DC power supply 10 and voltage supplied from a DC power supply 20 are shut off. Incidentally, as an example, a voltage of 5 volts is supplied to the DC power supply 10. The door 2 is opened, for example, when toner is replaced or a jam is fixed by a user. The relay 60 is a relay interlocked with the interlock SW 50 so that the relay 60 is turned off (is shut off from power supply) when the interlock SW 50 is turned off (i.e. shut off from power supply). The interlock SW 50 and the relay 60 are an example of a power-supply shutting unit (see FIG. 3). Incidentally, in the present application, the power-supply shutting unit shuts off the power-supply circuit in a mechanically interlocked manner with the door opening (the opening of the door 2). Alternatively, a door opening detecting unit (not shown) may be provided to detect the opening status of the door 2 so that the power supply is shut off on the basis of the detecting result of the detecting unit.

When the interlock SW 50 is turned on (i.e. in a power feeding state), the DC power supply 11 has the same electric potential as the DC power supply 10, so a voltage level of the DC power supply 11 becomes high. Incidentally, when the door 2 is opened, a voltage level of the DC power supply 11 is low because the DC power supply 11 is shut off from the DC power supply 10. Incidentally, “high” means a high level at which a voltage supply level is a predetermined voltage level (active), and “low” means a low level (0 volt) at which voltage supply is shut off; hereinafter, the high level and the low level are referred to simply as “high” and “low”, respectively.

When the interlock SW 50 is turned on, the relay 60 is also turned on. A voltage level of the DC power supply 21 becomes high because the DC power supply 21 has the same electric potential as the DC power supply 20 when the relay 60 is turned on. Incidentally, as an example, a voltage of 24 volts is supplied to the DC power supply 20.

The drive unit 70 includes a drive control unit 71 that controls a motor or the like for driving a photosensitive drum (not shown), and communicates with the optical unit 90. Voltage supplied from a DC power supply 40 is input to the drive control unit 71. Here, the DC power supply 40 is a power supply which is not shut off even when the door 2 is opened.

The image processing unit 80 includes an image-processing control unit 81 that controls a scanner (not shown) and a writing unit (not shown), etc. and a DC/DC converter 82 that steps down the DC power supply 21. To the image-processing control unit 81, two types of voltages are input: voltage supplied from the DC power supply 40 and voltage supplied from the DC power supply 21 which is shut off if the door 2 is opened. In the same manner as the drive control unit 71, the image-processing control unit 81 is supplied with voltage from the DC power supply 40 even when the door 2 is opened.

The image processing unit 80 supplies voltage to the optical unit 90 which is the communication counterpart of the drive unit 70. The image processing unit 80 causes the DC/DC converter 82 to step down the voltage supplied from the DC power supply 21 to an arbitrary value, and generates the DC power supply 30. The image processing unit 80 supplies the generated DC power supply 30 to the optical unit 90. A voltage level of the DC power supply 30 becomes high because the DC power supply 21 and the DC power supply 20 are the same in electric potential when the door 2 is closed and the DC power supply 30 is supplied with voltage from the DC/DC converter 82. Incidentally, when the door 2 is opened, a voltage level of the DC power supply 30 becomes low because voltage supplied to the DC power supply 30 is generated from the DC power supply 21 which is shut off from power supply when the door 2 is opened, so the DC power supply 30 is shut off from power supply when the door 2 is opened.

The optical unit 90 is the communication counterpart of the drive unit 70, and is a unit which is shut off from power supply when the door 2 is opened because the interlock SW 50 is turned off when the door 2 is opened. The optical unit 90 includes an optical control unit 91 which controls an optical system using a vertical cavity surface emitting laser (VCSEL) or the like. Voltage supplied from the DC power supply 30 is input to the optical control unit 91; however, when the door 2 is opened, the voltage from the DC power supply 30 is shut off.

Figure 3:
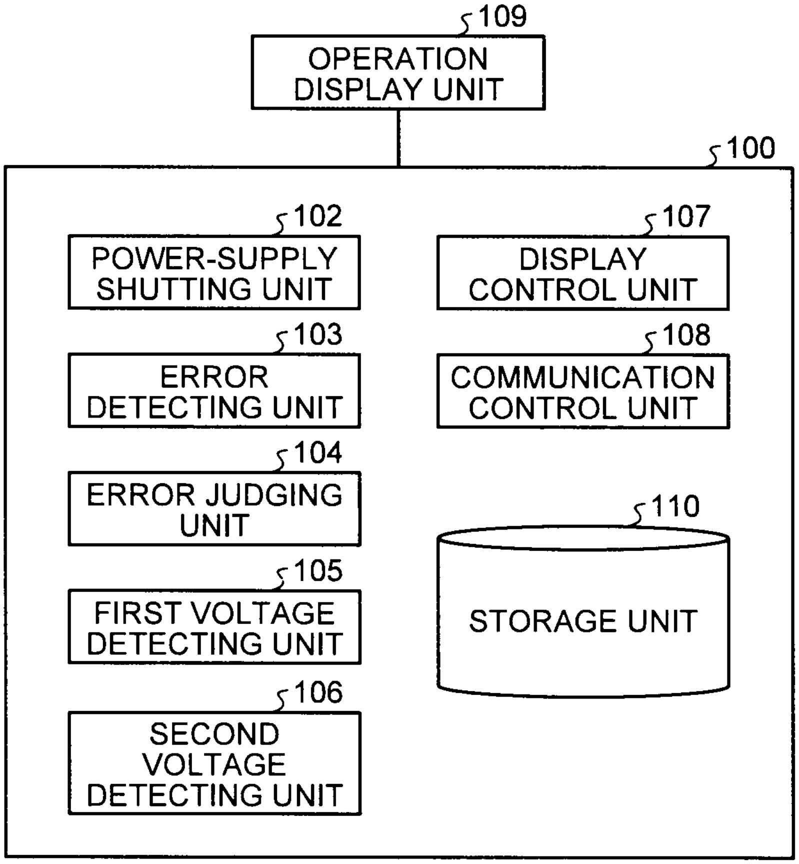
FIG. 3 is a block diagram showing a functional configuration of the image forming apparatus.

Subsequently, a functional configuration of the image forming apparatus 100 is explained. FIG. 3 is a block diagram showing the functional configuration of the image forming apparatus 100. As shown in FIG. 3, the image forming apparatus 100 mainly includes a power-supply shutting unit 102, an error detecting unit 103, an error judging unit 104, a first voltage detecting unit 105, a second voltage detecting unit 106, a display control unit 107, a communication control unit 108, an operation display unit 109, and a storage unit 110.

The power-supply shutting unit 102 is implemented by the interlock SW 50 and the relay 60 shown in FIG. 2. The storage unit 110 stores therein various applications and various types of information such as communication data.

The communication control unit 108 controls communication among various units via serial communication or bus communication, and stores communication data in the storage unit 110 at the end of the communication. Here, the communication control unit 108 employs polling as a communication method, and reads data several times as a measure against noise. For example, the communication control unit

108 causes the drive control unit 71 and the optical control unit 91 to transmit and receive data.

Furthermore, the communication control unit 108 causes the drive control unit 71 and the image-processing control unit 81 to transmit and receive information on the DC power supply 30 supplied to the optical control unit 91 and the DC power supply 11 shut off by the interlock. The communication control unit 108 checks whether at least any one of voltage supplied from the DC power supply 11 and voltage supplied from the DC power supply 30 is shut off before the start of communication between the units and at the end of the communication. When confirmed that at least any one of voltage supplied from the DC power supply 11 and voltage supplied from the DC power supply 30 is shut off before the start of communication, the communication control unit 108 does not initiate communication.

On the other hand, at the end of the communication, when confirmed that at least any one of voltage supplied from the DC power supply 11 and voltage supplied from the DC power supply 30 is shut off although they were not shut off before the start of communication, the communication control unit 108 judges the just-ended communication as abnormal. For example, the communication control unit 108 judge communication data transmitted/received via the just-ended communication as abnormal, and discards the communication data, and then retries to initiate communication after both the voltage supplied from the DC power supply 11 and the voltage supplied from the DC power supply 30 become high.

Figure 4:
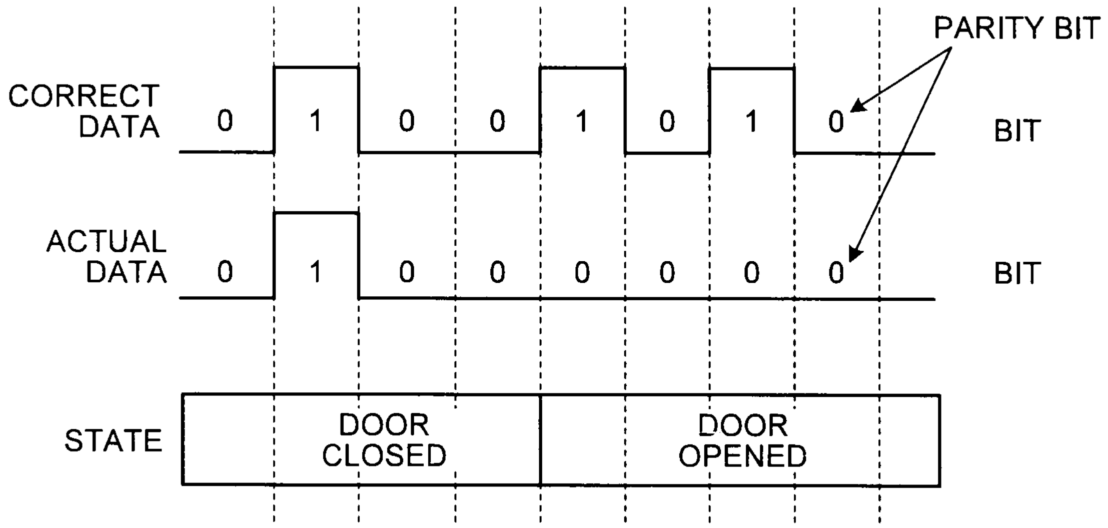
FIG. 4 is a diagram showing an example of a data structure of communication data.

Here, details of communication data are explained. FIG. 4 is a diagram showing an example of a data structure of communication data. As shown in FIG. 4, the communication control unit 108 controls communication between the units using 8-bit communication data including a 1-bit parity bit. Here, an error is detected by means of odd parity.

However, for example, when the door 2 is opened in the middle of transmission of communication data "01001010" from the optical control unit 91 to the drive control unit 71, the communication control unit 108 judges a result of the transmission of the communication data as normal despite the fact that no voltage is supplied to the optical control unit 91 and communication data becomes abnormal. As an example, as shown in FIG. 4, when the door 2 is opened after data "0100" out of the data "01001010" has been transmitted and voltage supply to the optical control unit 91 is stopped, the rest of the data "1010" is not transmitted, and "0000" is transmitted instead of "1010". This communication data is abnormal. However, the communication control unit 108 cannot detect the abnormality of the communication data even when the data "0000" having an odd parity by chance is transmitted instead of the data "1010" having an odd parity, since the communication control unit 108 detects the abnormality of the communication data by the odd parity. In the normal data, "1010" includes three digits of "1" (odd), and "0000" after the door is opened includes one digit of "1" (odd).

Therefore, in a case that the unit 108 confirms that at least any one of voltage from the DC power supply 11 and voltage from the DC power supply 30 is shut off at the end of the communication but they were not shut off before the start of communication, the communication control unit 108 judges all data transmitted/received via the communication as abnormal. Thereby, it is possible to prevent the situation in which the wrong communication data is stored in the storage unit 110 in a case that the door 2 is opened in the middle of the communication.

The power-supply shutting unit 102 is controlled in such a manner that the interlock SW 50 shuts off the voltage supplied from the DC power supply 10 and the relay 60 shuts off the voltage supplied from the DC power supply 20 when the interlock SW 50 and the relay 60 are turned off due to the door opening (the opening of the door 2).

The first voltage detecting unit 105 monitors a voltage level of the DC power supply 11, and detects a decrease in voltage of the DC power supply 11 due to shut off of voltage from the DC power supply 10. For example, the first voltage detecting unit 105 monitors a high/low status of voltage of the DC power supply 11. Here, the drive control unit 71 includes the first voltage detecting unit 105. As shown in FIG. 2, the DC power supply 11 is connected to just behind the interlock SW 50. On the other hand, the DC power supply 30 is connected to the interlock SW 50 via the relay 60 connected to just behind the interlock SW 50 and the image-processing control unit 81 connected to the relay 60. Therefore, the drive control unit 71 to which the voltage is supplied from the DC power supply 11 can detect that the interlock SW 50 is turned off (i.e. can detect the door opening), before the voltage to the DC power supply 30 is shut off. Incidentally, the first voltage detecting unit 105 is an example of the voltage detecting unit according to the present invention.

The second voltage detecting unit 106 monitors a voltage level of the DC power supply 30, and detects a decrease in voltage of the DC power supply 30 due to shut off of voltages from the DC power supply 11 and the DC power supply 20. For example, the second voltage detecting unit 106 monitors information on a high/low status of voltage of the DC power supply 30. Here, along of the configuration described above, the second voltage detecting unit 106 detects a decrease in voltage of the DC power supply 30 after the elapse of a certain period of time from a time point when the decrease in voltage of the DC power supply 11 has been detected. Incidentally, the second voltage detecting unit 106 is an example of the voltage detecting unit according to the present invention.

Furthermore, the second voltage detecting unit 106 transmits information on the voltage being monitored to the drive control unit 71 via the communication control unit 108. Here, the image-processing control unit 81 includes the second voltage detecting unit 106. The image-processing control unit 81 is supplied with voltage from the DC power supply 40 which is not shut off even when the door 2 is opened. Therefore, even when the door 2 is opened, the image-processing control unit 81 can communicate with the drive control unit 71. Incidentally, here, the image-processing control unit 81 includes the second voltage detecting unit 106. Alternatively, the drive control unit 71 can include the second voltage detecting unit 106, so that the drive control unit 71 can directly monitor the voltage from the DC power supply 30.

Figures 5, 6:
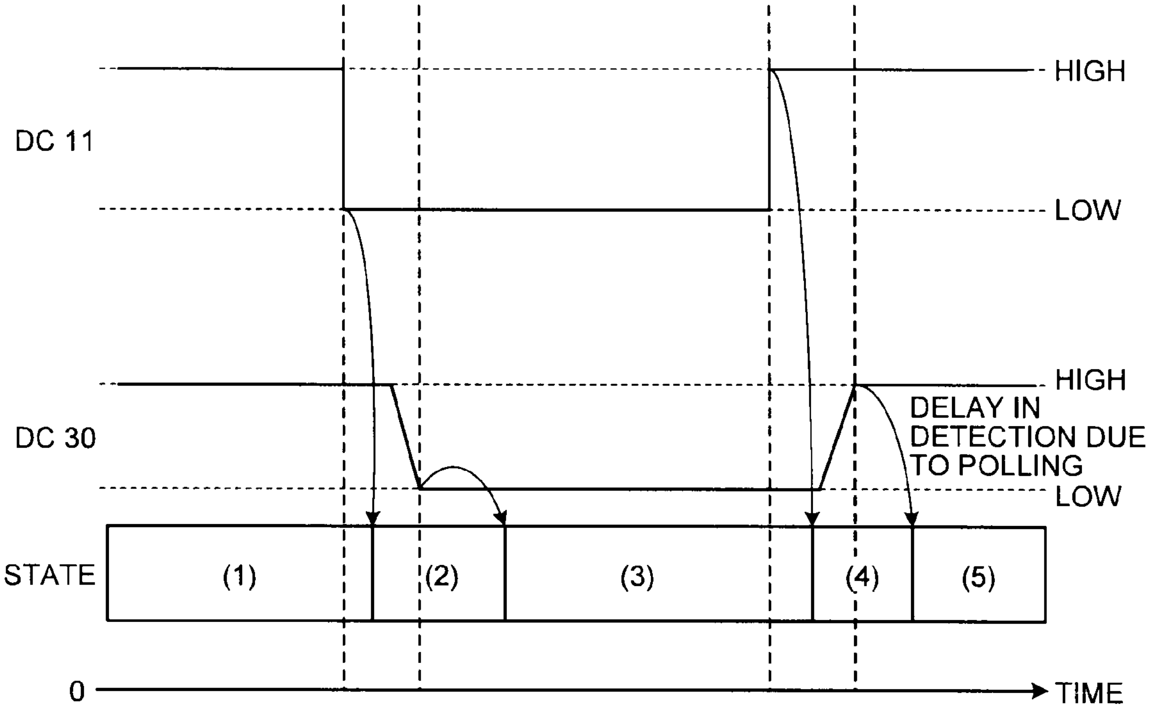
FIG. 5 is a diagram showing a change in state of voltage of each of a DC power supply 11 and a DC power supply 30.
FIG. 6 is a diagram showing a period in which a communication control unit can initiate communication.

Here, details of how the first and second voltage detecting units 105 and 106 detect a decrease in voltage are explained. FIG. 5 is a diagram showing a change in state of voltage of each of the DC power supply 11 and the DC power supply 30.

In FIG. 5, the denotation (1) refers to a time period in which a voltage level of the DC power supply 11 is judged as high by the first voltage detecting unit 105 and a voltage level of the DC power supply 30 is judged as high by the second voltage detecting unit 106. In the time period (1), since the DC power supply 11 and the DC power supply 30 are both supplied with voltage, the communication control unit 108 can initiate communication.

Furthermore, the denotation (2) refers to a time period in which, due to the opening of the door 2, the first voltage detecting unit 105 judges a voltage level of the DC power supply 11 as low, and the second voltage detecting unit 106 judges a voltage level of the DC power supply 30 as low. The time period (2) shows that the voltage of the DC power supply 11 is firstly shut off by the interlock SW 50, and then the voltage of the DC power supply 30 is shut off by the relay 60 after the elapse of a certain period of time from a time point when the voltage of the DC power supply 11 has been shut off, in a case that the door 2 is opened in the middle of the communication initiated by the communication control unit 108. Incidentally, because of the configuration of the circuit in which the relay 60 and the DC/DC converter 82 are connected in between the interlock SW 50 and the DC power supply 30, a decrease in the voltage of the DC power supply 30 is delayed from a decrease in the voltage of the DC power supply 11. Thus, the time period (2) shows that a voltage level of the DC power supply 30 becomes low after the elapse of a certain period of time from a time point when a voltage level of the DC power supply 11 has become low, because of the circuit-based delay.

Furthermore, arrows in FIG. 5 show time points when the first voltage detecting unit 105 or the second voltage detecting unit 106 detects any change in the voltage. As shown in FIG. 5, there is a difference between each time point when each power supply is shut down and thereby the voltage becomes low and each time point indicated by each arrow. This means that the detection is delayed by a predetermined polling interval from an actual time point when the voltage becomes low, since both the first and second voltage detecting units 105, 106 detect the decrease of the voltage by polling.

More specifically, if it is assumed a case that only the DC power supply 30 is monitored by the second voltage detecting unit 106, the voltage from the DC power supply 30 is shut off to the optical unit 90 which is the communication counterpart of the driving unit 70 before the first voltage detecting unit 105 detects the decrease of the voltage, because of the circuit-based delay and the polling-based delay. If the voltage from the DC power supply 30 is shut off in the middle of transmitting/receiving the communication data between the optical unit 90 and the driving unit 70, the communication error arises.

For example, in a case that the voltage from the DC power supply 30 is shut off in the middle of transmitting the communication data from the optical unit 90 to the driving unit 70, a part of the data transmitted after the time point when the voltage is shut off is likely to be wrong. And, the communication control unit 108 may store the communication data which does not actually transmitted/received in the storage unit 110 as the transmitted/received data. Thereby, the image processing can not be performed accurately. Therefore, it is required for the driving unit 70 to terminate the communication before the voltage from the DC power supply 30 is shut off to the optical unit 90, in order not to store the wrong communication data in the storage unit 110.

For that purpose, the first voltage detecting unit 105 monitors the voltage of the DC power supply 11 immediately after the interlock SW 50 in order to judge the communication as impossible during the time period (2). The communication control unit 108 can judge the abnormality of the communication data, since the decrease of the voltage of the DC power supply 11 is detected before the voltage from the DC power supply 30 is shut off to the optical control unit 91.

The denotation (3) refers to a time period in which the first voltage detecting unit 105 detects that the voltage from the DC power supply 11 is low and the second voltage detecting unit 106 detects that the voltage from the DC power supply 30 is low. The communication control unit 108 does not perform the communication during the time period (3).

The denotation (4) refers to a time period in which the first voltage detecting unit 105 detects that the voltage from the DC power supply 10 is high, since the door 2 once opened is closed again and thereby the interlock SW 50 is turned on to supply the voltage from the DC power supply 10. Incidentally, during the time period (4), the second voltage detecting unit 106 still judges that the voltage from the DC power supply 30 is low, because of the circuit-based delay and the polling-based delay. The reason of monitoring the DC power supply 30 is as follows. If the DC power supply 11 is monitored only, the voltage from the DC power supply 11 becomes high due to the door closing and thereby it is judged that the door is closed. However, the voltage from the DC power supply 30 to the optical control unit 91 is still low because of the circuit-based delay through the relay 60 and the DC/DC converter 82. Thereby, the communication data from the optical control unit 91 becomes wrong. Thereby, the communication control unit 108 resumes the communication only after the first voltage detecting unit 105 judges that the voltage from the DC power supply 11 is high followed by the detection by the second voltage detecting unit 106 judging that the voltage from the DC power supply 30 is high through a detection delay time due to the polling or the circuit configuration.

The denotation (5) refers to a time period in which the first voltage detecting unit 105 judges that the voltage from the DC power supply 11 is high and the second voltage detecting unit 106 judges that the voltage from the DC power supply 30 is high. In the time period (5), the communication control unit 108 can perform the communication, since the voltage is supplied to both the DC power supplies 11 and 30.

FIG. 6 is a diagram showing time periods in which the communication control unit 108 can perform the communication. FIG. 6 shows that the communication control unit 108 can perform the communication in the time periods (1) and (5), and cannot perform the communication in other time periods (2) to (4). These time periods are explained for FIG. 5 illustrating the transition state of the voltage. As shown in FIG. 6, it is judged that both the voltage from the DC power supply 11 and the voltage from the DC power supply 30 are high in the time period (1), while it is judged that the voltage from the DC power supply 11 is low and the voltage from the DC power supply 30 is high in the time period (2). And, it is judged that both the voltage from the DC power supply 11 and the voltage from the DC power supply 30 are low in the time period (3), while it is judged that the voltage from the DC power supply 11 is high and the voltage from the DC power supply 30 is low in the time period (4). Further, it is judged that both the voltage from the DC power supply 11 and the voltage from the DC power supply 30 are high in the time period (5).

Now back to FIG. 2, the error detecting unit 103 detects the communication error of the communication control unit 108. For example, the communication error includes any trouble of lines, any failure in data transmitting/receiving, and so on.

The error judging unit 104 judges whether any communication abnormality exists in a case that the error detecting unit 103 detects the communication error. For example, the error judging unit 104 confirms that the error detecting unit 103 detects the communication error three times continuously and judges that the communication abnormality exists in the case that the communication error is detected three times continuously.

The purpose of confirming the communication error a plurality of times continuously by the error judging unit 104 is for judging certainly the true communication abnormality. For example, it is not necessary to judge the communication abnormality in the case that the communication error is detected due to only noise or the like. Because, the communication control unit 106 can resolve such a communication error by retrying the communication.

The display control unit 107 displays various types of information on the operation display unit 109. The display control unit 107 displays the existence of the communication abnormality on the operation display unit 109, in a case that the error judging unit 104 judges the communication abnormality.

Figure 7:
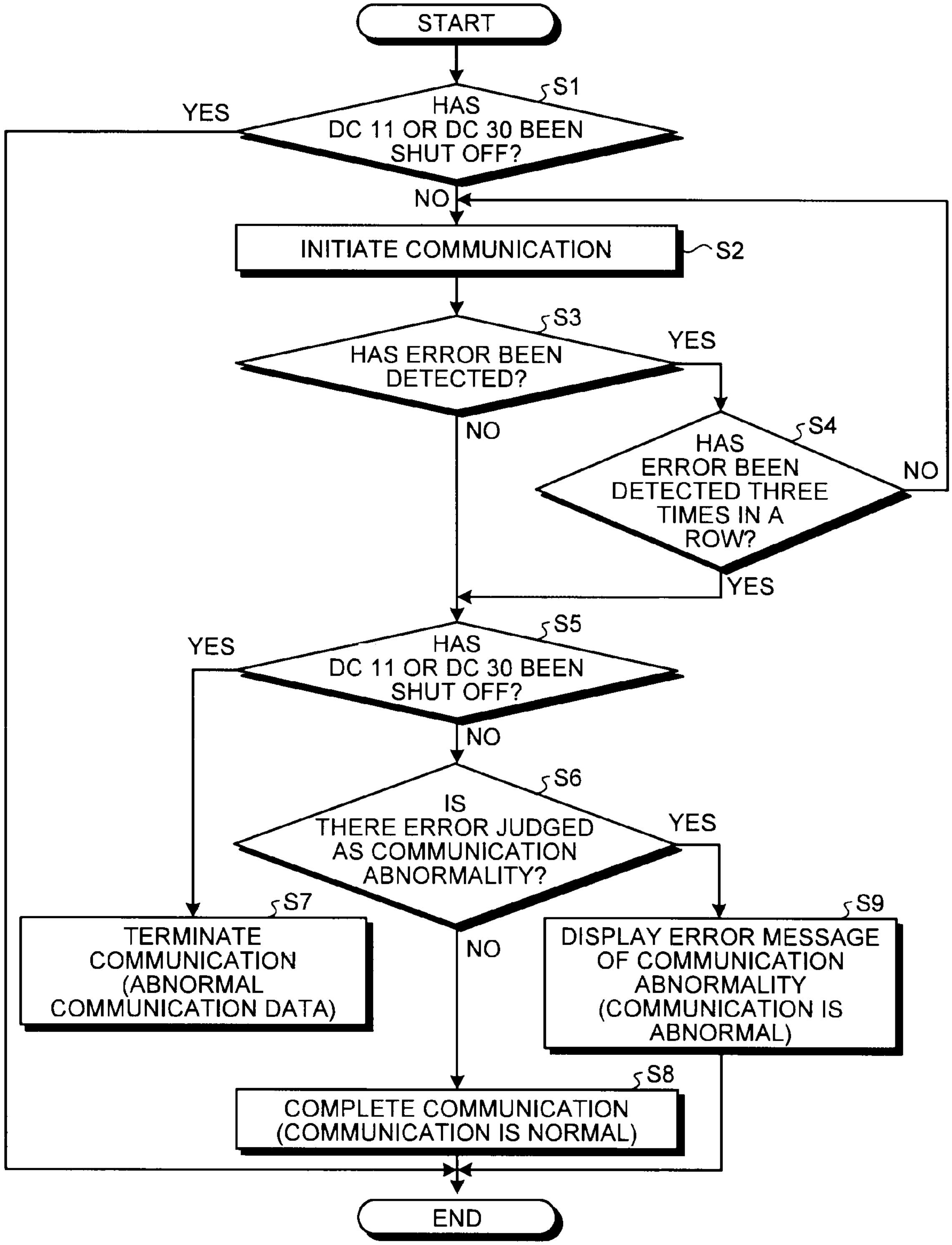
FIG. 7 is a flowchart showing a processing procedure for communication between a drive unit and an optical unit.

Next, an explanation will be made on the communication processing procedure between the driving unit 70 and the optical unit 90. FIG. 7 is a flowchart illustrating a procedure of the communication processing between the driving unit 70 and the optical unit 90.

The communication control unit 108 confirms whether at least one of the DC power supplies 11 and 30 is shut off (Step S1). For example, the communication control unit 108 confirms the shut off of the voltage in a case that at least one or both of the DC power supplies 11 and 30 detects any voltage reduction.

If the communication control unit 108 confirms that at least one of the DC power supplies 11 and 30 is not shut off (NO in Step S1), the unit 108 performs the communication (Step S2). The error detecting unit 103 detects whether the communication error is due to the communication control unit 108 (Step S3). The error judging unit 104 confirms whether the communication error is detected three times continuously (Step S4), if the communication error is due to the communication control unit 108 (YES in Step S3). The communication control unit 108 returns to Step S2 to retry the communication, if it is not confirmed that the error judging unit 104 detects the communication error three times continuously (NO in Step S4).

The communication control unit 108 confirms whether at least one of the DC power supplies 11 and 30 is shut off (Step S5), in a case that no error is detected by the error judging unit 104 (NO in Step S3), and in a case that it is confirmed that the error judging unit 104 detects the communication error three times continuously (YES in Step S4). For example, the communication control unit 108 confirms the shut off of the voltage in at least either one of a case that the first voltage detecting unit 105 detects the decrease of the voltage supplied from the DC power supply 11 and a case that the second voltage detecting unit 106 detects the decrease of the voltage supplied from the DC power supply 30.

Once the communication control unit 108 confirms that at least one of the DC power supplies 11 and 30 is shut off (YES in Step S5), it judges that the transmitted/received communication data as abnormal followed by terminating the communication (Step S7). For example, the communication control unit 108 discards the communication data of the terminated communication and then retries the communication only after the voltages from the DC power supplies 11 and 30 become high.

On the other hand, the communication control unit 108 confirms whether the error judging unit 104 judges the communication abnormality (Step S6), if the unit 108 confirms that either of the DC power supplies is not shut off (NO in Step S5). For example, the communication control unit 108 checks for reference the judgment result of Step S4 with the error judging unit 104.

Once the communication control unit 108 confirms that the error judging unit 104 does not detect any communication abnormality (NO in Step S6), the communication is judged as normal and terminated (Step S8). On the other hand, the communication control unit 108 controls the display control units 107 to display the existence of the communication abnormality on the operation display unit 109 (Step S9), if the error judging unit 104 judges the communication abnormality (YES in Step S6).

If the communication control unit 108 confirms that at least one of the DC power supplies 11 and 30 is shut off at Step 1 (YES in Step S1), it does not perform the communication and terminates the processing.

Thus, according to this embodiment, the communication control unit 108 confirms at least one of the DC power supplies 11 and 30 is shut off before and after the communication. If any shut off is confirmed, the transmitted/received communication data is judged as abnormal. Therefore, the communication abnormality can be accurately detected even in a case that the door opening occurs at any time point from the start of the communication to the end of the communication.

Figure 8:
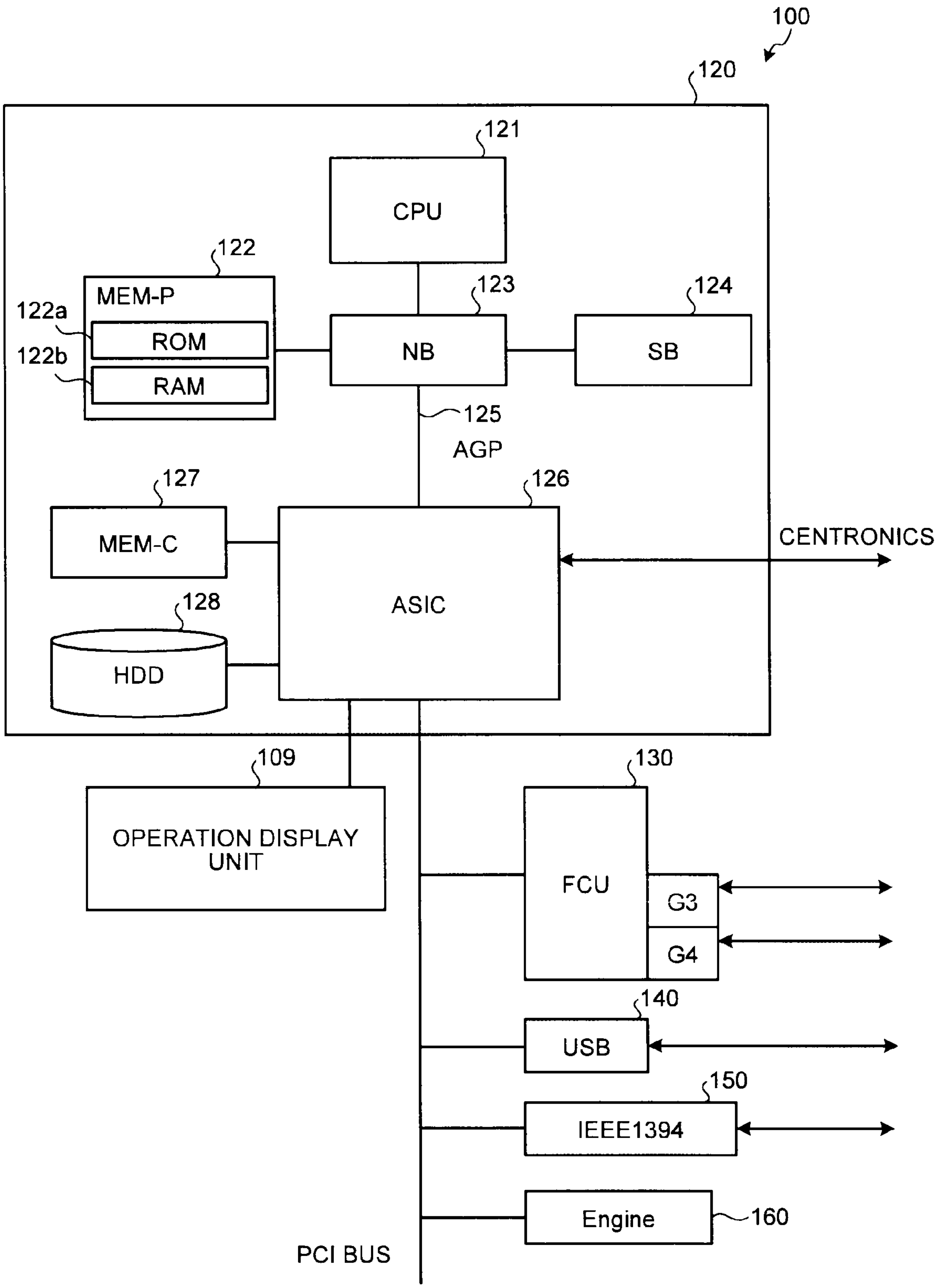
FIG. 8 is a block diagram showing a hardware configuration of a multifunction peripheral as an example of the image forming apparatus according to the present embodiment.

FIG. 8 is a block diagram illustrating a hardware configuration of a MFP (Multi-Function Peripheral) as an example of the image forming apparatus 100 according to the present embodiment (hereinafter referred to as MFP 100). As show in the figure, this MFP 100 includes a controller 120 and an engine unit 160. The controller 120 and the engine unit 160 are connected by a PCI (Peripheral Component Interconnect) bus. The controller 120 is a controller which controls the entire MFP 100 and controls drawing, communications, and input from an operation unit (not shown). The engine unit 160 may be a printer engine or the like connectable to the PCI bus such as a black-and-white plotter, a 1-drum color plotter, a 4-drum color plotter, a scanner, a fax unit, and so on. Incidentally, the engine unit 160 includes an image processing part for performing error diffusion, gamma conversion, and the like in addition to the so-called engine part, such as a plotter.

The controller 120 includes a CPU 121, a North Bridge (NB) 123, a system memory (MEM-P) 122, a South Bridge (SB) 124, a local memory (MEM-C) 127, an ASIC (Application Specific Integrated Circuit) 126, and a hard disk drive (HDD) 128. The NB 123 and the ASIC 126 are connected by an AGP (Accelerated Graphics Port) bus 125. The MEM-P 122 includes a ROM (Read Only Memory) 122*a* and a RAM (Random Access Memory) 122*b*.

The CPU 121 controls the entire MFP 100, and has a chipset composed of the NB 123, the MEM-P 122, and the SB 124. The CPU 121 is connected to other devices via the chipset.

The NB 123 is a bridge for connecting the CPU 121 to the MEM-P 122, the SB 124, and the AGP bus 125, and includes a memory controller for controlling read/write with respect to the MEM-P 122 and the like, a PCI master, and an AGP target.

The MEM-P 122 is a system memory used as a memory for storing a program or data, a memory for unpacking the program or data, a memory for drawing by a printer, and the like, and is composed of the ROM 122*a* and the RAM 122*b*. The ROM 122*a* is a read only memory used as a memory for storing a program or data. The RAM 122*b* is a read-write memory used as a memory for unpacking the program or data, a memory for drawing by a printer, and the like.

The SB 124 is a bridge for connecting the NB 123 to a PCI device and a peripheral device. The SB 124 is connected to the NB 123 via the PCI bus. A network interface (I/F) and the like are connected to the PCI bus.

The ASIC 126 is an image processing IC (Integrated Circuit) including hardware components for image processing. The ASIC 126 serves as a bridge for connecting the AGP bus 125, the PCI bus, the HDD 128, and the MEM-C 127. The ASIC 126 is composed of a PCI target, an AGP master, an arbiter (ARB) which is the core of the ASIC 126, a memory controller for controlling the MEM-C 127, a plurality of DMACs (Direct Memory Access Controllers) for performing rotation of image data or the like by a hardware logic, and a PCI unit for performing data transfer between the controller 120 and the engine unit 160 via the PCI bus. An FCU (Facsimile Control Unit) 130, a USB (Universal Serial Bus) 140, and an IEEE 1394 (the Institute of Electrical and Electronics Engineers 1394) interface 150 are connected to the ASIC 126 via the PCI bus. The operation display unit 109 is directly connected to the ASIC 126.

The MEM-C 127 is a local memory used as a copy image buffer and a code buffer. The HDD 110 is a storage for storing therein image data, a program, font data, and a form.

The AGP bus 125 is a bus interface for a graphics accelerator card proposed to speed up the graphics operation, and accelerates the graphics accelerator card by direct access to the MEM-P 122 at high throughput.

Incidentally, a communication control program executed by the image forming apparatus 100 according to the present embodiment is built into the ROM or the like in advance.

Alternatively, the communication control program executed by the image forming apparatus 100 according to the present embodiment can be stored in a computer-readable recording medium, such as a CD-ROM, a flexible disk (FD), a CD-R, or a digital versatile disk (DVD), in an installable or executable file format, and the recording medium can be provided.

Furthermore, the communication control program executed by the image forming apparatus 100 according to the present embodiment can be stored on a computer connected to a network such as the Internet, and the communication control program can be provided by causing a user to download it via the network. Moreover, the communication control program executed by the image forming apparatus 100 according to the present embodiment can be provided or distributed via a network such as the Internet.

The communication control program executed by the image forming apparatus 100 according to the present embodiment is composed of modules including the above-described units (the power-supply shutting unit 102, the error detecting unit 103, the error judging unit 104, the first voltage detecting unit 105, the second voltage detecting unit 106, the display control unit 107, and the communication control unit 108). The CPU 121 (processor) as actual hardware reads out the communication control program from the ROM 122*a*, and executes the communication control program, thereby loading the above units on the main memory, and the power-supply shutting unit 102, the error detecting unit 103, the error judging unit 104, the first voltage detecting unit 105, the second voltage detecting unit 106, the display control unit 107, and the communication control unit 108 are generated on the main memory.

Incidentally, in the above embodiment, there is described an example where the image forming apparatus according to the present invention is applied to an MFP having at least any two of a copy function, a printer function, a scanner function, and a facsimile function; however, the image forming apparatus according to the present invention can be applied to any image forming apparatuses, such as a copier, a printer, a scanner device, and a facsimile machine.

According to the present invention, even if the door opening occurs at any time point from the start of communication to the end of the communication, the communication abnormality can be detected accurately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

a processing unit that performs a predetermined process;

a power-supply shutting unit that shuts off power supply to the processing unit when a predetermined door is opened;

a voltage detecting unit that detects a decrease in voltage at a point located posterior to the power-supply shutting unit; and a communication control unit that does not initiate communication with the processing unit if the decrease in voltage is detected by the voltage detecting unit before a start of the communication with the processing unit, and judges just-ended communication as abnormal if the decrease in voltage is detected by the voltage detecting unit after an end of the communication with the processing unit.

2. The image forming apparatus according to claim 1, wherein the voltage detecting unit detects a decrease in a first voltage at the point located posterior to the power-supply shutting unit and a decrease in a second voltage supplied to the processing unit, and the communication control unit does not initiate communication with the processing unit if at least any one of the decrease in the first voltage and the decrease in the second voltage is detected before the start of communication with the processing unit, and judges the communication with the processing unit as abnormal if at least any one of the decrease in the first voltage and the decrease in the second voltage is detected after the end of the communication with the processing unit.

3. The image forming apparatus according to claim 2, wherein the first voltage decreases when voltage supplied to the processing unit is shut off, and the second voltage decreases after an elapse of a certain period of time since the first voltage has decreased.

4. The image forming apparatus according to claim 2, wherein the second voltage is a voltage output from a relay that isolates a feed circuit for feeding electric power to the processing unit if the opening of the predetermined door is detected.

5. The image forming apparatus according to claim 1, wherein when judging the communication with the processing unit as abnormal, the communication control unit discards communication data transmitted/received via the communication with the processing unit.

6. The image forming apparatus according to claim 1, wherein when judging the communication with the processing unit as abnormal, the communication control unit retries to initiate communication with the processing unit.

7. A computer program product comprising a non-transitory computer-readable medium having computer-readable program codes embodied in the medium for controlling a communication, the program codes when executed causing a computer to execute a method, the computer including a processing unit that performs a predetermined process, and a power-supply shutting unit that shuts off power supply to the processing unit when a predetermined door is opened, the method comprising:

detecting a decrease in voltage of a point located posterior to the power-supply shutting unit; and not initiating communication with the processing unit if the decrease in voltage is detected before a start of the communication with the processing unit and judging just-ended communication as abnormal if the decrease in voltage is detected after an end of the communication with the processing unit.

8. A method, implemented by an image forming apparatus having a processing unit that performs a predetermined process, comprising:

shutting off, by a power-supply shutting unit, power supply to the processing unit when a predetermined door is opened;

detecting, by a voltage detecting unit, a decrease in voltage at a point located posterior to the power-supply shutting unit; and not initiating, by a communication control unit, communication with the processing unit if the decrease in voltage is detected by the voltage detecting unit before a start of the communication with the processing unit, and judging just-ended communication as abnormal if the decrease in voltage is detected by the voltage detecting unit after an end of the communication with the processing unit.

* * * * *